July 2, 1963   K. GEBELE ETAL   3,095,790
PHOTOGRAPHIC CAMERA
Filed June 9, 1960   3 Sheets-Sheet 1

July 2, 1963  K. GEBELE ETAL  3,095,790
PHOTOGRAPHIC CAMERA
Filed June 9, 1960  3 Sheets-Sheet 2
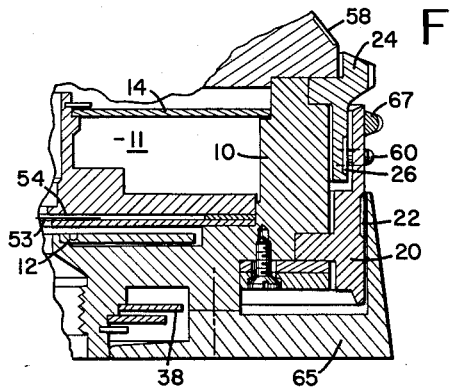
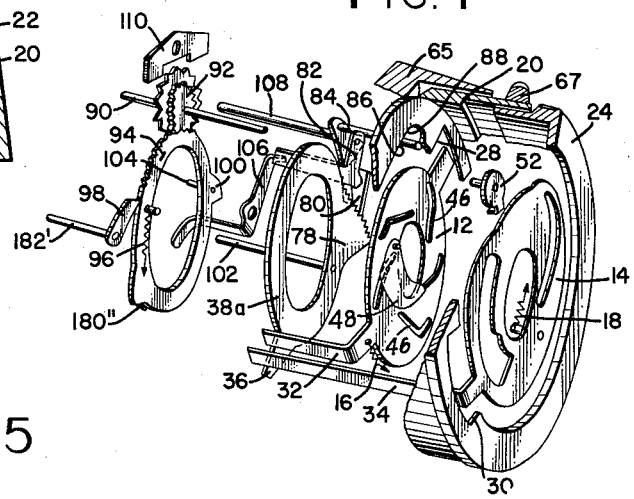
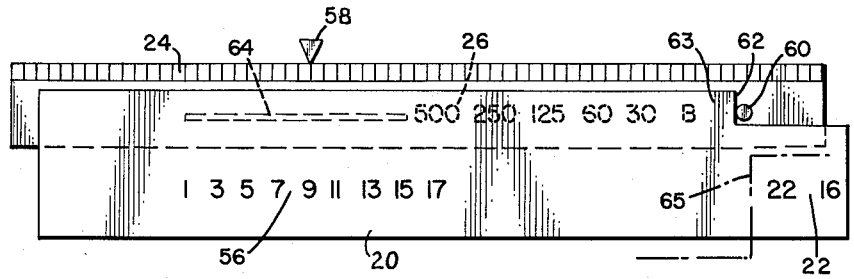
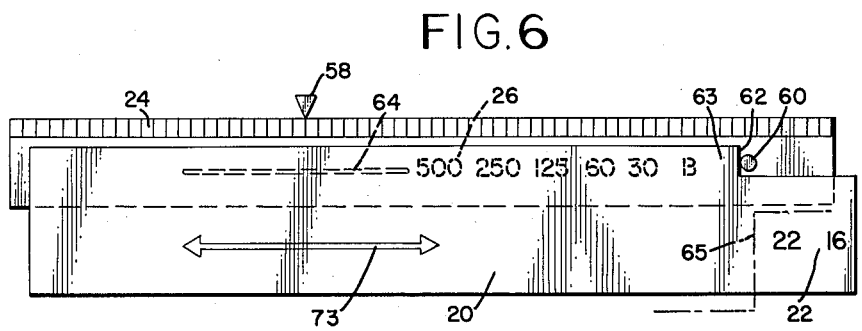

July 2, 1963 K. GEBELE ETAL 3,095,790
PHOTOGRAPHIC CAMERA
Filed June 9, 1960 3 Sheets-Sheet 3
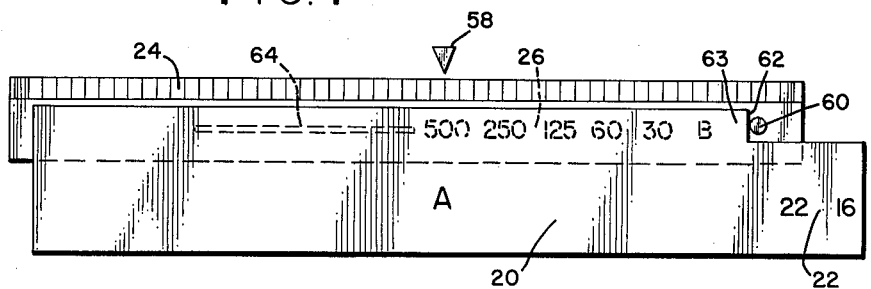
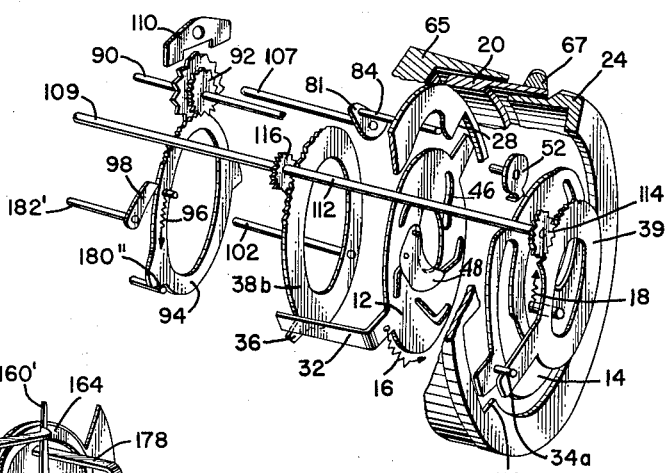
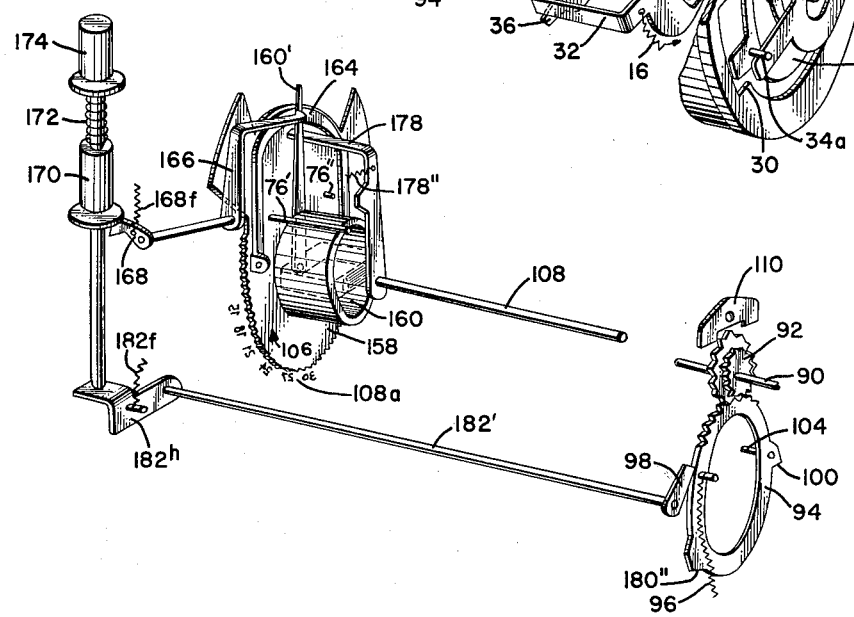

United States Patent Office 3,095,790
Patented July 2, 1963

3,095,790
PHOTOGRAPHIC CAMERA
Kurt Gebele and Franz Singer, Munich, Germany, assignors to Compur-Werk Gesellschaft mit beschrankter Haftung & Co., Munich, Germany, a German firm
Filed June 9, 1960, Ser. No. 35,069
Claims priority, application Germany June 11, 1959
15 Claims. (Cl. 95—10)

The present invention relates to a photographic camera, and more particularly to setting the exposure value of a still camera.

An object of the invention is to provide a generally improved and more satisfactory exposure value setting mechanism for a photographic camera.

Another object is the provision of a shutter wherein the exposure value may be set manually and, if desired, the independent selection of a particular shutter speed and diaphragm aperture without regard to exposure value may be made.

Yet another object is to provide a new and improved exposure value setting mechanism arranged to be coupled to the follow-up pointer of an exposure meter for manual setting, and further arranged for the manual setting of any selected values of speed and aperture.

A further object is the provision of a new and improved exposure value setting mechanism for automatically setting both the shutter speed and diaphragm aperture according to the position of the measuring pointer of an exposure meter.

A still further object is to provide a shutter of the foregoing kind wherein the setting mechanism may be changed over to manual actuation simply and conveniently.

These and other desirable objects may be attained in the manner disclosed as an illustrative embodiment of the invention in the following description and in the accompanying drawings forming a part hereof, in which:

FIG. 3 is a fragmentary axial cross-section of the shutter of FIG. 1, taken radially;

FIG. 4 is a diagrammatic illustration of a second embodiment of the invention in which the exposure value is adjusted automatically;

FIG. 5 is a developed projection of the shutter speed and diaphragm aperture setting members shown in FIG. 3, illustrating an arrangement for the manual selection of exposure values, either in conjunction with or independently of an exposure meter;

FIG. 6 is a view similar to FIG. 5 showing the arrangement for manual adjustment of the setting members by reference to the indications of an exposure meter;

FIG. 7 is a view similar to FIG. 5 for the arrangement of the setting members in which exposure values are adjusted automatically (as in FIG. 4);

FIG. 8 is a diagrammatic illustration of still another embodiment of the invention in which the exposure value is adjusted automatically; and FIG. 9 is a schematic perspective view of a portion of a photographic camera, and is a continuation to the left of the mechanism of FIG. 4, certain parts being shown in both filgures.

The same reference numerals throughout the several views indicate the same parts.

Figure 1:
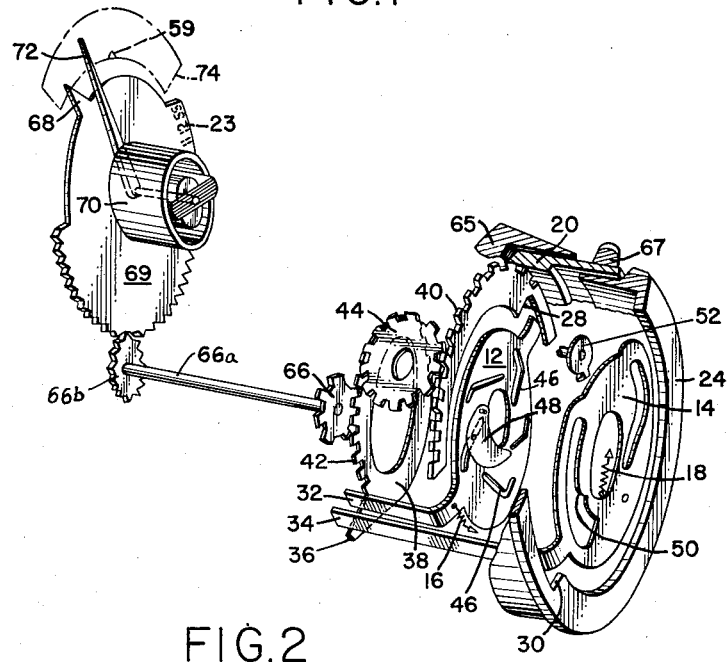
FIG. 1 is a fragmentary diagrammatic illustration of a first embodiment of the photographic shutter and associated parts according to the invention arranged for manual adjustment of the exposure value.

Referring to FIGS. 1 and 3, a shutter housing 10 of a photographic shutter is provided defining an annular space 11 within which is mounted a suitable shutter blade operating mechanism which may, for example, take the form disclosed in Patents 2,900,885 and 2,900,886, of K. Gebele, issued August 25, 1959. A diaphragm aperture control member 12 is suitably mounted for rotation within the housing 10 about the optical axis and is biased for movement in a counterclockwise direction by a spring 16 toward a rest position at one end of its range of travel. A shutter speed control member 14 is also mounted for rotation within the housing 10 and is biased by a spring 18 for movement in a counterclockwise direction toward one end of its range of travel. The diaphragm aperture control member 12 may be adjusted rotatively against the resistance of the spring 16 by an aperture setting ring 20 having a circumferentially graduated diaphragm aperture scale 22 of conventional form, see FIG. 2, the setting ring 20 being accessible for external rotation and having an axial abutment shoulder 28 to entrain an arm on the ring 12.

Like the ring 20, a shutter speed setting ring 24 is mounted for rotation on the periphery of the housing 10 and is adjacent thereto. The setting ring 24 has an abutment shoulder 30 for entraining an arm on the shutter speed control member 14, to adjust the member 14 rotatively against the resistance of the spring 18, and furthermore has a circumferentially graduated shutter speed scale 26 on its periphery. The diaphragm control member 12 has an axially extending arm 32, whereas the shutter speed control member 14 has a similar arm 34. Both arms 32 and 34 are urged by the respective springs 16 and 18 into contact with a projecting radial abutment 36 on an exposure value adjusting member 38. The adjusting member 38 is mounted for rotation about a rear lens tube formed integrally with the shutter housing 10 as shown in FIG. 3. The diaphragm setting member 20 has peripheral gear teeth 40, and the exposure value adjusting member 38 has similar peripheral gear teeth 42, the sets of gear teeth being geared together by a motion reversing pinion 44 mounted on a stationary pivot in the shutter housing.

The diaphragm control member 12 has a plurality of the usual obliquely extending slots 46 for engaging the movable pivots of a plurality of diaphragm leaves 48, only one of which is shown in the drawing, to control their position and thereby determine the aperture of the diaphragm opening. The shutter speed control member 14 has a timing cam slot 50 for controlling the shutter speed in a well known manner. A tensioning disk 52 secured to the tensioning shaft of the shutter is provided to tension the master member or drive member of the shutter mechanism, which is not here shown, to initiate the opening and closing action of the shutter blades 53 mounted in the space 54 as shown diagrammatically in FIG. 3.

In addition to the previously mentioned diaphragm aperture scale 22, the aperture setting member 20 carries a circumferentially graduated exposure value scale 56. The scale 56 is spaced circumferentially from the scale 22, and these scales as well as the shutter speed scale 26 may be adjusted by reference to a fixed index mark 58 on the periphery of the shutter housing 10 or on a suitable fixed part at the forward end of the housing 10. Secured to the speed setting member 24 is an axially extending changeover pin 60. The pin 60 is engageable with an entraining shoulder 62 on the aperture setting member 20. As best seen in FIG. 5, the shoulder 62 is provided by one edge of a mask 63 for the speed scale 26, which is covered in certain rotational positions of the ring 20 relative to the ring 24. Thumb grips 67 are provided for the convenient manipulation of the aperture setting member 20.

For the adjustment of the camera to a particular shutter speed and diaphragm aperture using the scales 22 and 26, without regard to the exposure value as indicated by the scale 56, the positions of the shutter speed and diaphragm control member 14 and 12, respectively, are determined by the positions of the abutment shoulders 30 and 28, against which the respective arms on the control members 14 and 12 are biased by their respective springs 18 and 16. The shoulder 30 may engage the same arm 34 which cooperates with the abutment arm 36. In the preferred arrangement, shoulder 28 engages a special arm on the ring 12 rather than directly engaging the arm 32, but the effect is the same. Abutment 36 on the exposure value adjusting member 38 is operatively connected with the aperture setting member 20 by pinion 44, and will be located outside the deflection range of arms 32 and 34 when the diaphragm aperture scale 22 is settable opposite the index mark 58. Alternatively or additionally, owing to the cooperation of change-over pin 60 with shoulder 62, the shutter speed scale 26 may be within the reading range of index mark 58.

To make a rapid adjustment of the camera to a particular exposure value, the aperture setting member 20 is rotated to aline the desired indication of the exposure value scale 56 with the index mark 58. During this rotation, abutment shoulder 62 of the aperture setting member 20 entrains the change-over pin 60 on the speed setting member 24 and displaces member 24 until the first indication of the speed scale 26 registers with mark 58. That is to say, the speed setting member 24 is displaced far enough to prevent abutment 30 from interfering with the free deflection of arm 34. At the same time, the motion-reversing pinion 44 causes rotation in the opposite direction of abutment 36 of the exposure value setting member 38, thus moving this abutment toward the two arms 32 and 34 and into contact with the same when they are in that end position, in a counterclockwise direction, in which the tension of the loading springs 16 and 18 is least. Further rotation of the aperture setting member 20 rightwardly (viewed as in diagrammatic FIG. 2) to bring the range of the exposure value scale 56 opposite the index mark 58 will therefore cause abutment 36 to deflect the two arms 32 and 34 against the resistance of their springs. At the same time, abutment shoulder 62 will engage the change-over pin 60 and will further displace the speed setting member 24 rightwardly to move the fastest speed or "500" graduation of the speed scale 26 rightwardly beyond the index mark 58 and to bring the extension line 64 of this scale opposite the index mark.

The speed control member 14 will not move further to the right beyond its fastest speed or 1/500 sec. position, however, because a suitable abutment or stop member (not shown) prevents rightward movement beyond this point, and also because any further rightward movement of the setting member 20 beyond the position where exposure value "17" comes opposite the index mark 58 will move the member 38 leftwardly sufficiently far so that the member 36 will pick up or entrain the arm 34 of the speed control member 14 and will move this speed control member to the left even though the speed setting member 24 moves to the right. In other words, whenever the setting member 20 is in a position in which any part of the exposure value scale 56 below the value "17" thereof is opposite the index mark 58, then the position of the speed control member 14 is determined by its engagement with the abutment 36 on the exposure value adjusting member 38, rather than by engagement with the abutment 30 on the speed setting member 24.

Figure 2:
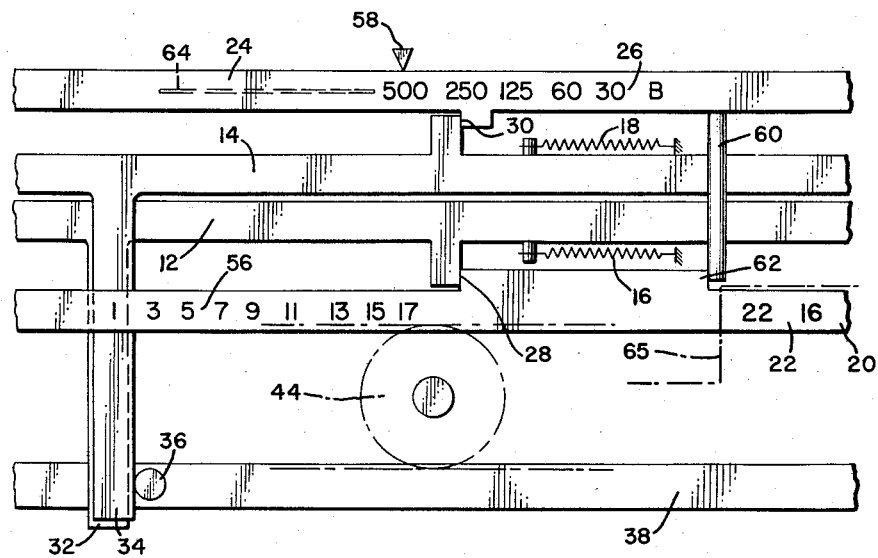
FIG. 2 is a schematic representation of a developed or flattened-out projection of portions of the shutter of FIG. 1, to illustrate better its manner of operation.

To make an independent selection of a particular shutter speed and diaphragm aperture, without regard to the exposure value, the desired aperture may be set by rotating the aperture setting member 20 to aline the selected value on the scale 22 with the mark 58. This causes the reversing pinion 44 to withdraw abutment 36 of the exposure value adjusting member 38 out of the range of the arms 32 and 34 of the two control members 12 and 14. The shoulder 62 moves out of engagement with the change-over pin 60, permitting the speed setting member 24 to be freely adjusted to any position within the range of the shutter speed scale 26. When the diaphragm aperture setting member 20 is rotated for adjustment to the left, as shown in FIG. 2, without manual change of the position of the speed setting member 24, the speed control member 14 will remain at the 1/500 second setting, a position indicated by the fact that either the extension line 64 of the speed scale 26 or the speed numeral "500" thereof will be opposite the index mark 58.

If desired, the exposure value adjusting member 38 may be coupled with the follow-up pointer of an exposure value meter, to be positioned by alinement with the measuring pointer of the meter rather than by setting the exposure value on the scale 56 as explained. In the modification, which is also illustrated in FIG. 1, a pinion 66 is in meshing engagement with the gear teeth 42 on the periphery of the adjusting member 38, and the pinion 66 is connected by a shaft 66a and another pinion 66b with the toothed periphery of an exposure meter mounting plate 69 bearing a follow-up pointer 68. A suitable exposure meter 70, such as a moving coil galvanometer type, is mounted next to but independently of the plate 69 and has an indicating pointer 72. It is well understood that the pointer 72 deflects according to the particular brightness conditions as measured by a conventional photoelectric cell mounted in any suitable position on the camera and facing forwardly toward the scene to be photographed. The setting ring 20 is rotated until the follow-up pointer 68 is alined with the meter pointer 72, the rotary movements of the ring being transmitted to the pointer 68 through the transmission chain comprising the parts 40, 44, 38 66, 66b and 69, as is clear from the previous description. In this case, the exposure value scale may be omitted from the member 20, as shown in FIG. 6, and is preferably transferred from the aperture setting member 20 to the exposure meter, and may, for instance, be marked on a fixed part of the structure in position to be visible through a window 74 of the exposure meter. The angular range of the aperture setting member 20 for setting exposure values according to this modification of the invention may be specially indicated by a circumferential mark 73 on the member 20, see FIG. 6.

If the aperture setting member 20 is rotated out of the range of the exposure value scale into the range for setting a selected diaphragm aperture as indicated by the scale 22, the follow-up pointer 68 is moved beyond the edge of the viewing window 74 of the exposure meter. The edge of the pointer plate 69 then appears in the window 74 instead of the follow-up pointer. The edge of the plate 69 preferably carries a supplemental diaphragm aperture scale 23 to be set in cooperation with a fixed index mark 59 on the edge of the viewing window 74. An advantage of this arrangement is that the adjustment of the camera to a short exposure time is permitted for taking quickly moving objects in fluctuating light, and without lowering the camera, the aperture of the camera may be set by observing the scale 23 which is visible in the window 74 of the exposure meter.

In another embodiment of the invention illustrated in FIG. 4, the exposure value adjusting member 38a is controlled automatically by an exposure meter instead of being operated manually by adjustment of the setting ring 20. In this arrangement, a mechanism is used for detecting the position of the clamped pointer of the exposure meter, in the manner disclosed in the copending patent applications of K. Gebele, Serial No. 842,145, filed September 24, 1959 (now Patent 3,044,377, granted July 17, 1962), and Serial No. 853,648, filed November 17, 1959 (now Patent 2,969,004, granted January 24, 1961). To facilitate the better understanding of the device of FIG. 4, the left hand portion of FIG. 1 of the said application Serial No. 853,648 has been reproduced as FIG. 9 of the present drawings. However, the left hand portion of FIG. 3 of application Serial No. 842,145 would be equally satisfactory for purposes of the present invention, the two constructions differing from each other only in respects which are unimportant so far as the present invention is concerned. It will be understood that FIG. 4 of the present application is a continuation to the right of FIG. 9 with certain parts shown in both figures, and that the present mechanism of FIG. 4 replaces the prior mechanism at the right of FIG. 1 in either of said prior applications, Serial Nos. 842,145 and 853,648.

The structure and operation of FIG. 9 will be briefly reviewed to an extent sufficient for an understanding of the present invention by one skilled in the art, and reference may be made to the mentioned copending applications for a more complete explanation of the background of the present invention, which may be helpful to those who are not already familiar with recent developments in this field of automatic exposure setting mechanisms. In a shutter of the style herein disclosed, the shutter is usually cocked or tensioned by a shaft which is connected to the film winding or film transport mechanism in the camera body, so that the shutter is tensioned automatically and simultaneously when the film is advanced. The tensioning shaft is indicated fragmentarily at 90 in FIG. 4 as well as in FIG. 9 of the present drawings. This tensioning shaft 90 is fixed to a tensioning disk 52 which serves to tension or cock the master member of the shutter mechanism, and the shaft also carries a pinion 92 which meshes with the teeth of a control ring 94 to move the control ring to its tensioned position when the shaft 90 is rotated.

The camera includes a built-in photoelectric exposure meter (see FIG. 9) mounted on a supporting plate 158 rotatable in the camera body, the measuring mechanism 160 of the meter being operatively coupled in a suitable manner with the photocell, not here shown. Upon rotating the supporting plate 158, the meter pointer 160' can be brought into any given angular position with respect to the camera, to introduce, for instance, the variable factor of film speed into the mechanism. Thus, a reference mark 106 is provided on the plate 158 to be set opposite any desired graduation of the film speed scale 108a on a stationary part of the camera body.

Mounted on the supporting plate 158 is a stirrup-like pivoted clamping member 164 which, when actuated by a swinging arm 166, presses against the forward face of the pointer 160' and clamps it fast against the normally stationary (although adjustable) supporting plate 158 located just to the rear of the pointer. The movement of the clamping arm 166 is effected by the camera release member 174 in the form of a plunger. When the plunger 174 is depressed, this compresses a spring 172 which presses on a slidable sleeve 170, thereby moving the arm or link 168 connected to the swinging arm 166, to cause the swinging arm to clamp the pointer 160'. Upon releasing the plunger, a spring 168f moves the sleeve 170 upwardly and moves the arm 166 so that the pointer 160' is no longer clamped. On the supporting plate 158 there are two stop pins, 76' and 76", which limit the range of swinging movement of the pointer 160'. The stop pin 76' serves also as a stop for a feeler member 178 which is fixed to a shaft 108 and cooperates with the pointer 160' of the exposure meter. A spring 178" tends to turn the parts 178, 108 in a counterclockwise direction and to hold them in the extreme or limit position determined by the pin 76'.

The previously mentioned control ring 94 is acted upon by a spring 96 tending to turn the ring 94 in a counterclockwise direction to its rest or rundown position. A locking pawl 98 is operatively connected to the release plunger 174 and serves to drop behind a notch 180" on the ring 94, to hold the ring in its tensioned position until the release plunger is depressed, whereupon the locking pawl 98 is released. The pawl 98 is fixed to the end of a shaft 182' having at its rear end a lever 182h which underlies the plunger 174 so that depression of the plunger turns the shaft 182' in a counterclockwise direction, against the force of the restoring spring 182f, to release the latch 98.

Another projection 100 on the ring 94 serves, when the ring is turned in a clockwise direction, to engage an axially extending pin 102 fixed to the exposure value adjusting ring 38a. The ring 94 also has a driving pin 104 so positioned that when the ring 94 is turned in a clockwise direction from its rest or rundown position, this pin will engage an arm on a swinging lever 106 mounted on a stationary pivot, and turn this lever in a counterclockwise direction on its pivot, so that its other arm will push against the rearwardly extending arm of a swinging lever 82 fixed to the shaft 108 of the feeler member 178, the pressure being applied in a manner to turn this shaft 108 clockwise, by the clockwise rotation of the ring 94 and the consequent counterclockwise rotation of the lever 106. Right alongside of the lever 82, there is a pawl 80 rotatable on the shaft 108 and having a downwardly directed lug constituting a locking tooth. Under the action of a coil spring surrounding the end of the shaft 108, the parts 80 and 82 are held in coupling engagement, with the locking tooth of the pawl 80 resting against one edge of the swinging lever 82. The locking tooth of the pawl 80, depending on the position to which it is moved by rotation of the shaft 108, lies in the path of one or another of the step-shaped notches or abutments 78 provided on the periphery of the adjusting ring 38a. The pawl 80 is furthermore connected with a pin 84 which cooperates with a cam edge 86 on the aperture setting member 20. When the shutter is to be manually operated to set a selected shutter speed and diaphragm aperture, the cam 86 engages the pin 84 and deflects and rotates the pawl 80 counterclockwise to a position out of engagement with the step abutments 78. For automatic operation of the shutter, however, the aperture setting member 20 is rotated to aline the mark "A" (standing for automatic) with the index mark 58 as shown in FIG. 7. At this point, a lobed recess 88 of cam 86 releases pawl 80 for deflection into the range of action of the stepped abutments 78. The position of this mark "A" on the aperture setting member 20 corresponds with the first division of the exposure value scale, such as scale 56 in FIG. 5, which would register with mark 58 if an exposure value scale were provided.

Like the previous construction described in connection with present FIGS. 1–3, the diaphragm control ring 12 has its arm 32 biased into contact with the abutment 36 on the exposure value adjusting ring 38a by the spring 16, and the speed control ring 14 has its arm 34 biased by the spring 18 into contact with the abutment 36. The aperture setting ring 20 and the speed setting ring 24 cooperate with the respective rings 12 and 14 in the manner previously described. In this embodiment, however, the motion reversing pinion 44 between the exposure value adjusting ring 38a and the aperture setting member 20 is eliminated.

The operation for the automatic setting of the shutter of FIG. 4 will be discussed, it being understood that for manual setting to a particular selected shutter speed and diaphragm aperture, the operation is the same as for the FIG. 1 embodiment. The film speed is selected and set by manually rotating the supporting plate 158 to aline the mark 106 with the desired value on the film speed scale 108a. The aperture setting ring 20 is rotated to aline mark "A" (FIG. 7) with the index mark 58. Upon tensioning the shutter which results in a counterclockwise rotation of the shaft 90 and pinion 92, the control ring 94 is rotated clockwise against the resistance of the return spring 96 into a tensioned position where it is retained by the pawl 98. During this tensioning action, projection 100 engages the pin 102 to rotate the adjusting ring 38a likewise in a clockwise direction and to move the two control members 12 and 14, by reason of the engagement of the arms 32 and 34 with the abutment 36, into an end postion in a clockwise direction. In this end position, the diaphragm aperture control ring 12 is at its largest diaphragm aperture, such as at $f:2.8$, while the shutter speed control ring 14 is at its longest automatically timed position, such as $1/30$ of a second. Upon being released, it will be understood that the exposure time is adjusted progressively shorter and shorter as the diaphragm becomes smaller and smaller, until the limiting values of $1/500$ of a second and $f:22$ are reached, at the other end of the range of adjustments of the rings 12 and 14. Of course, any other pairings of shutter speed and diaphragm aperture which give the desired range of exposure values may be used. Additionally, during the tensioning of the shutter, the pin 104 engages the lever 106, which in turn rotates lever 82 and the connected shaft 108, to rotate the feeler member 178 in a clockwise direction to its limiting position.

The releasing of the shutter by depressing the plunger 174 results in a swinging of the arm 166 against the member 164 to clamp the measuring pointer 160' in its indicating position, according to the brightness of the scene being measured. Simultaneously with the depression of plunger 174, lever 182h is swung to rotate shaft 182' and locking pawl 98 to release the control member 94 for running down motion under the actuation of its spring 96. The projection 100 pulls away from the pin 102, and the exposure value adjusting member 38a commences to rotate counterclockwise due to the action of springs 16 and 18 which transmit torque through arms 32 and 34 to abutment 36. Pin 104 releases lever 106, thereby allowing pawl 80 and shaft 108 to rotate as the feeler member 178 moves counterclockwise under the tension of its spring 178" until stopped by the clamped pointer 160'. The locking tooth on the pawl 80 is deflected into the path of motion of the proper one of the stepped abutments 78, and assumes a position dependent upon the stopped position of the feeler member 178. The locking tooth thus engages the particular one of the stepped abutments 78 which corresponds to the exposure value as indicated by the clamped pointer 160'. The return motion of the control ring 94 is delayed by retarding mechansim 110, so that pawl 80 reaches its operative position before the stepped abutments 78 have rotated into contact with it. The exposure value adjusting ring 38a rotates through a given angle before being intercepted by the pawl 80, as do the diaphragm aperture control ring 12 and the shutter speed control ring 14, thus establishing the adjustment of the speed and diaphragm control members corresponding with the exposure value actually measured by the exposure meter.

For the adjustment of the camera to an exposure value either by hand or automatically using the exposure value adjusting member 38 or 38a, the presence of the aperture and speed scales 22 and 26 is not required. In order to avoid mistakes and simplify the setting of the camera, both scales are desirably fully masked for these modes of operation. When abutment 62 reaches change-over pin 60 the masking edge 63 of the ring 20 will already have covered the speed scale 26. Further rotation of the aperture setting ring 20 causes the aperture scale 22 to move underneath a cover member 65 (FIGS. 2, 5, and 6) secured to the adaptor ring of the shutter housing, or to the body of the camera, and the aperture scale will be completely masked when the first division of the exposure scale 56 reaches mark 58.

For manual setting, the pin 84 deflects pawl 80 out of the range of abutments 78 as previously explained, so that the projection 36 continues to rotate biased by the arms 32 and 34 and springs 16 and 18 until the rings 12 and 14 contact the shoulders 28 and 30. The projection 36 is thus no longer effective to determine the positions of the rings 12 and 14.

In another embodiment of the invention illustrated in FIG. 8, the exposure value adjusting member, here indicated at 38b, merely serves for setting the diaphragm aperture control member 12. A second exposure value adjusting member 39 is associated with the speed control member 14, and is rotatably mounted forwardly thereof. The arm 34 of the previously described constructions is replaced by a forwardly extending pin 34a which is biased by spring 18 into engagement with a radial arm on the member 39. The two exposure value adjusting members 38b and 39 have peripheral gear teeth and are coupled by a transmission including a shaft 112 and two pinions 114 and 116, each in meshing engagement with the respective rings 39 and 38. This arrangement will be preferred if there is insufficient space between the diaphragm control ring 12 and the shutter speed control ring 14 to allow the necessary deflection of arm 34.

In this construction, the movement of the feeler member 178 is directly transmitted by a shaft 109 to the shaft 112, which may be integral therewith. Such an arrangement will be readily understood by those skilled in the art. As an example which may be helpful to those who are not sufficiently familiar with this art, see the construction which is illustrated in FIG. 7 of the previously mentioned application Serial No. 853,648 (now Patent 2,969,004), wherein it is seen that the feeler member is formed with an arcuate rack which meshes with a pinion secured to the end of a shaft corresponding to the present shaft 109. Upon releasing the shutter, it is seen that the feeler member turns counterclockwise until engaging the clamped pointer, thereby rotating the shafts 109 and 112 to turn the exposure value adjusting members 38b and 39 by a corresponding amount. The speed control ring 14 and diaphragm aperture control ring 12 are accordingly adjusted simultaneously to the pair of values corresponding to the exposure value measured by the clamped pointer 160'.

The FIG. 8 embodiment may be operated manually in a manner similarly described with regard to FIG. 4 to set independently selected shutter speeds and apertures. A pin 84 is engageable with a cam on the inside of the aperture setting member 20, this pin 84 being coupled with a lever 81 and a shaft 107 to remove the meter pointer 160' out of the deflection range of the feeler member 178, whenever the setting members are to be operated by hand. Here the shaft 107 of FIG. 8 corresponds to the shaft 123 in FIG. 2 of the pending patent application Serial No. 853,648 (Patent 2,969,004) which can turn the pointer of the exposure meter to a position out of the range of the feeler. The arrangement mentioned above is not shown in the present application for purposes of clearness, but will be readily understood by those skilled in this art, especially those familiar with Patent 2,969,004 which has resulted from the previously mentioned copending application 853,648. The ring 38b continues to run down although the arms 32 and 34 are stopped by engagement with the abutment shoulders 28 and 30. As previously discussed, the cover ring 65 masks the diaphragm aperture scale 22 when the mark "A" indicating automatic operation reaches index 58. At this time, the cover member 63 also masks the shutter speed scale 26, since it is unnecessary to use either scale while the exposure value is being set automatically.

Among the distinctions which differentiate the embodiment disclosed in connection with FIG. 8 from the embodiments previously disclosed in connection with FIGS. 1 and 4, there may be mentioned the fact that in FIG. 8 there are two separate rings 38b and 39 which adjust the setting of the diaphragm aperture and the shutter speed, respectively, whereas in the previous embodiments both of these factors of diaphragm aperture and shutter speed are adjusted or controlled by a single ring 38 (FIG. 1) or 38a (FIG. 4).

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. An exposure value adjusting mechanism for a photographic camera having an optical axis, said mechanism comprising a shutter speed control ring and a diaphragm aperture control ring each mounted for rotation about the optical axis, an axially extending arm on each of said control rings, a spring for biasing each of said control rings toward a rest position, exposure value adjusting ring means mounted for rotation about the optical axis and having radial abutment means, said control ring arms each being biased into contact with said radial abutment means by its respective spring, means for rotating said exposure value adjusting ring means to a desired exposure value position, the control rings following under the force of their respective springs to assume positions dependent upon the exposure value indicated, externally accessible shutter speed and diaphragm aperture setting rings rotatable about the optical axis, said aperture setting ring having aperture setting positions and at least one exposure value setting position, an internal shoulder on each of said setting rings to be engageable with its respective control ring to determine the position of said control rings when said setting rings indicate selected aperture and speed values without regard to exposure value, and means operated by movement of said aperture setting ring from its exposure value setting position to an aperture setting position for rendering ineffective said radial abutment means on said exposure value adjusting ring means to determine the position of said control rings when said setting rings indicate selected aperture and speed values.

2. A construction as defined in claim 1, including a coupling between said aperture and speed setting rings for entraining said speed setting ring upon movement of said aperture setting ring to an exposure value setting position, to move the speed setting ring to one end of its range.

3. An exposure value adjusting mechanism for a photographic camera having an optical axis, said mechanism comprising a shutter speed control member and a diaphragm aperture control member each mounted for rotation about the optical axis, each of said control members having an axially extending arm, a spring for biasing each of said control members toward a rest position, exposure value adjusting means mounted for rotation about the optical axis and having at least one abutment, the arms of said control members being biased independently into contact with said exposure value adjusting means abutment by their respective springs, means for rotating said adjusting means to a desired exposure value position, the control members following under the force of their respective springs to assume positions dependent upon the exposure value indicated, and externally accessible diaphragm aperture and shutter speed setting members rotatable about the optical axis and each having an abutment projecting into the path of movement of the respective aperture and speed control members to be engageable therewith when said setting members are moved to positions for indicating selected aperture and speed values, the abutment on said exposure value adjusting means being rendered ineffective to determine the position of said control members when said setting members indicate selected aperture and speed values without regard to exposure value.

4. A construction as defined in claim 3, including an entraining shoulder on said aperture setting member and a change-over pin on said speed setting member, said shoulder being engageable with said pin to displace said speed setting member upon rotation of said aperture setting member to an exposure value setting position.

5. A construction as defined in claim 3, including a shutter speed scale on said speed setting member and a diaphragm aperture scale on said aperture setting member, an exposure value setting indication spaced circumferentially from said aperture scale on said aperture setting member, an entraining shoulder on said aperture setting member and a change-over pin on said speed setting member, said entraining shoulder being an edge of a mask which covers said speed scale when said aperture setting member is rotated to engage said shoulder with said change-over pins in moving to a position reading the exposure value setting indication.

6. A construction as defined in claim 5, further including a stationary cover member behind which said aperture scale moves when said aperture setting member is rotated to read the exposure value setting indication.

7. An exposure value adjusting mechanism for a photographic camera having an optical axis, said mechanism comprising a shutter speed control ring and a diaphragm aperture control ring each mounted for rotation about the optical axis, each of said control rings having an axially extending arm, a spring for biasing each of said control rings toward a rest position, exposure value adjusting ring means mounted for rotation about the optical axis and having radial projection means, the arms on said control rings being biased independently into contact with said radial projection means, means for rotating said exposure value adjusting ring means to a desired exposure value position to cause corresponding adjustment of said control rings, externally accessible diaphragm aperture and shutter speed setting members rotatable about the optical axis and each having an internal shoulder projecting into the path of movement of the respective aperture and speed control rings to be engageable therewith for setting selected aperture and speed values without regard to exposure value, and means operatively engaged with said aperture setting means for rendering ineffective the projection means on said exposure value adjusting ring means to determine the position of said control rings when said setting members indicate selected aperture and speed values.

8. A construction as defined in claim 7, including a shutter speed scale on said speed setting member and a diaphragm aperture scale on said aperture setting member, an exposure value setting indication spaced circumferentially from said aperture scale on said aperture setting member, an entraining shoulder on said aperture setting member and a change-over pin on said speed setting member, said entraining shoulder engaging said change-over pin to displace said speed setting member to the first division of the speed scale when said aperture setting member is positioned to the exposure value setting indication.

9. A construction as defined in claim 7, further including masking means for covering said speed and aperture scales when said aperture setting member is positioned to the exposure value setting indication.

10. Photographic exposure setting mechanism comprising a diaphragm aperture control ring and a shutter speed control ring both rotatable through respective ranges about a common axis of rotation, spring means tending to turn each of said rings toward one end of its respective range, a manually operable diaphragm aperture adjusting member having an abutment for engaging said aperture control ring to hold such control ring against the action of its spring means in a position determined by the position of said aperture adjusting member, a manually operable speed adjusting member having an abutment for engaging said speed control ring to hold such control ring against the action of its spring means in a position determined by the position of said speed adjusting member, and exposure value control means rotatable about said common axis and having abutment means for engaging both of said control rings to hold both of said control rings against the action of said spring means in related positions determined by the position of said exposure value control means independently of said abutments on said aperture adjusting member and said speed adjusting member.

11. A construction as defined in claim 10, further including means operated by movement of said exposure value control means to an effective operating position for shifting said abutments on said aperture adjusting member and speed adjusting member to ineffective position.

12. A construction as defined in claim 11, in which said exposure value control means is operatively connected by reversing gearing to said aperture adjusting member.

13. A construction as defined in claim 12, in which said aperture adjusting member and said speed adjusting member have cooperating abutment portions to move one of them by movement of the other.

14. A construction as defined in claim 10, in which said exposure value control means has a series of steps, and in which a pawl is adjustable to engage a selected one of said steps, to position said exposure value control means.

15. A construction as defined in claim 10, in which said exposure value control means includes two separate members axially spaced from each other and operatively connected to rotate together.

References Cited in the file of this patent
UNITED STATES PATENTS

| | | |
|---|---|---|
| 2,148,963 | Rauch | Feb. 28, 1939 |
| 2,252,573 | Leitz | Aug. 12, 1941 |
| 2,868,095 | Gebele | Jan. 13, 1959 |
| 2,887,025 | Rentschler | May 19, 1959 |
| 2,900,885 | Gebele | Aug. 25, 1959 |
| 2,900,886 | Gebele | Aug. 25, 1959 |
| 2,906,166 | Herterich | Sept. 29, 1959 |
| 2,913,969 | Faulhaber | Nov. 24, 1959 |
| 2,969,004 | Gebele | Jan. 24, 1961 |